United States Patent
Luo et al.

(10) Patent No.: US 9,678,555 B2
(45) Date of Patent: Jun. 13, 2017

(54) METHODS AND SYSTEMS FOR CALIBRATION OF VOLTAGE REGULATOR SYSTEMS WITH MULTIPLE TYPES OF POWER STAGES

(71) Applicants: Shiguo Luo, Austin, TX (US); Kejiu Zhang, Round Rock, TX (US); Hang Li, Austin, TX (US); John J. Breen, Harker Heights, TX (US)

(72) Inventors: Shiguo Luo, Austin, TX (US); Kejiu Zhang, Round Rock, TX (US); Hang Li, Austin, TX (US); John J. Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 305 days.

(21) Appl. No.: 14/470,217

(22) Filed: Aug. 27, 2014

(65) Prior Publication Data
US 2015/0370300 A1 Dec. 24, 2015

Related U.S. Application Data

(60) Provisional application No. 62/014,442, filed on Jun. 19, 2014.

(51) Int. Cl.
| | | |
|---|---|---|
| G06F 12/00 | (2006.01) | |
| G06F 1/28 | (2006.01) | |
| G06F 12/02 | (2006.01) | |

(52) U.S. Cl.
CPC ............ *G06F 1/28* (2013.01); *G06F 12/0238* (2013.01); *G06F 12/0246* (2013.01); *Y02B 60/1225* (2013.01)

(58) Field of Classification Search
CPC .... G06F 1/28; G06F 12/0238; G06F 12/0246; Y02B 60/1225
See application file for complete search history.

(56) References Cited

U.S. PATENT DOCUMENTS

| | | |
|---|---|---|
| 6,346,801 B1 | 2/2002 | Zafarana et al. |
| 7,265,601 B2 | 9/2007 | Ahmad |
| 7,673,157 B2 | 3/2010 | Chapuis et al. |
| 7,999,520 B2 | 8/2011 | Luo et al. |
| 8,125,200 B2 | 2/2012 | Tsai et al. |
| 8,570,006 B2 | 10/2013 | Moussaoui et al. |

(Continued)

OTHER PUBLICATIONS

Rahardjo et al., "Systems and Methods of Current Sense Calibration for Voltage Regulator Circuits", U.S. Appl. No. 14/449,949, filed Aug. 1, 2014, 43 pgs.

(Continued)

*Primary Examiner* — Shawn X Gu
(74) *Attorney, Agent, or Firm* — Egan, Peterman, Enders, Huston

(57) ABSTRACT

Methods and systems are disclosed that may be employed to enable multi-phase voltage regulator (VR) system calibration during the development phase of a multi-phase VR system so as to meet defined accuracy targets and, in one example, to avoid the need for system level calibration in a production environment. The disclosed systems and methods may be further implemented to enable use of multiple sources for and types of integrated power stages (IPstages) in a common multi-phase VR system configuration while still achieving the required current sense accuracy, thus reducing or substantially eliminating continuity of supply (COS) concerns.

19 Claims, 6 Drawing Sheets

(56) References Cited

U.S. PATENT DOCUMENTS

| | | |
|---|---|---|
| 8,957,658 B2 | 2/2015 | Nakamura et al. |
| 9,000,786 B2 | 4/2015 | Luo et al. |
| 2005/0073288 A1 | 4/2005 | Harris |
| 2006/0190532 A1 | 8/2006 | Chadalavada |
| 2006/0212143 A1 | 9/2006 | Nguyen et al. |
| 2009/0153110 A1 | 6/2009 | Huang |
| 2010/0225287 A1 | 9/2010 | Schultz |
| 2010/0277151 A1 | 11/2010 | Tsai et al. |
| 2012/0275610 A1 | 11/2012 | Lambert et al. |
| 2012/0324246 A1 | 12/2012 | Rahardjo et al. |
| 2013/0057239 A1 | 3/2013 | Kalje |
| 2013/0207630 A1 | 8/2013 | Rahardjo et al. |
| 2013/0265022 A1 | 10/2013 | Ulbrich |
| 2013/0278234 A1 | 10/2013 | Kreliner |
| 2013/0318371 A1 | 11/2013 | Hormuth |
| 2014/0082236 A1 | 3/2014 | Zhang et al. |
| 2014/0232420 A1 | 8/2014 | Luo et al. |
| 2015/0188425 A1 | 7/2015 | Chang et al. |

OTHER PUBLICATIONS

System Power States, Printed From Internet Aug. 25, 2014, 2 pgs.
Intel, "$2^{nd}$ Generation Intel Core Processor Family Mobile With ECC", Datasheet Addendum, May 2012, 42 pgs.
Richards et al., "Calibration of Voltage Regulator", U.S. Appl. No. 14/334,122, filed Jul. 17, 2014, 32 pgs.
Luo et al., "Methods and Systems for Improving Light Load Efficiency for Power Stages of Multi Phase Voltage Regulator Circuits", U.S. Appl. No. 14/470,344, filed Aug. 27, 2014, 38 pgs.
Luo et al., "Methods and Systems for Implementing Adaptive Fet Drive Voltage Optimization for Power Stages of Multi Phase Voltage Regulator Circuits", U.S. Appl. No. 14/470,455, filed Aug. 27, 2014, 36 pgs.

METHODS AND SYSTEMS FOR CALIBRATION OF VOLTAGE REGULATOR SYSTEMS WITH MULTIPLE TYPES OF POWER STAGES

This application claims the benefit of U.S. Provisional Patent Application Ser. No. 62/014,442, filed on Jun. 19, 2014 and entitled "Methods And Systems For Calibration Of Voltage Regulator Systems With Multiple Types Of Power Stages", which is incorporated herein by reference in its entirety for all purposes.

The present application is related in subject matter to concurrently filed patent application Ser. No. 14/470,344 entitled "METHODS AND SYSTEMS FOR IMPROVING LIGHT LOAD EFFICIENCY FOR POWER STAGES OF MULTI-PHASE VOLTAGE REGULATOR CIRCUITS" by Luo et al., and to concurrently filed patent application Ser. No. 14/470,455 entitled "METHODS AND SYSTEMS FOR IMPLEMENTING ADAPTIVE FET DRIVE VOLTAGE OPTIMIZATION FOR POWER STAGES OF MULTI-PHASE VOLTAGE REGULATOR CIRCUITS" by Luo et al. which is incorporated herein by reference in its entirety.

FIELD OF THE INVENTION

This application relates to information handling systems, and more particularly to power stage calibration for voltage regulator (VR) circuitry.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

High current information handling system loads, such as for CPU's and memory, typically require multi-phase voltage regulators (VR's). An integrated power stage (IPstage) of each VR phase is an integrated circuit that is usually composed of a MOSFET (metal oxide semiconductor field effect transistor) driver, a high-side MOSFET, and a low-side MOSFET. In addition to an IPstage, a VR phase also usually includes an inductor with all the phase inductors being tied together at their output. One example of a multi-phase VR architecture may be found in U.S. Pat. No. 7,999,520. Generally, each MOSFET supplier for integrated power stages uses a different silicon process for fabrication. Different silicon processes result in a different MOSFET drain to source resistance in on-state or RDS(on) characteristics as a function of gate drive voltage or gate-to-source voltage ($V_{GS}$).

Servers are a type of information handling system that is requiring ever increasing accuracy for power telemetry data to be used in system level power and thermal management algorithms. For example, CPU power management algorithms poll CPU load current information from a Vcore Voltage Regulator (VR) in order to optimize CPU performance versus power consumption while still maintaining safe operation of the system. Power measurement is required from a system VR with data reported over a serial voltage identification (SVID) bus between the VR controller and the CPU. Accuracy of current sense directly impacts system performance, power saving and reliability. Consequently, tighter current-sense accuracy targets are being presented by CPU manufacturers, e.g., such as +/−10% for 1-5% of maximum load, +/−5% for 5-30% of maximum load, and +/−3% for 30-100% maximum load.

Inductor direct current resistance (DCR) sense has been widely used in the power industry for many years. Considering second source parameter mismatch and additional tolerance from soldering, actual DCR tolerance (TOL) used for current sense may be up to 8% given a 5% TOL inductor. Consequently, current sense tolerance over load range for a conventional high accuracy digital VR controller is not capable of meeting new accuracy standards defined by CPU manufacturers for various loading range segments. Production VR calibration has been proposed to improve current sense accuracy as described in U.S. patent application Ser. No. 13/768,357, filed Feb. 15, 2013.

Discrete power stages (separate dual FET and FET driver packages), including DrMOS, have been traditionally used for main-stream server systems, and inductor DCR current sense is employed. Another possible approach to improving current sense accuracy is to use smart power stage (SPS) technology with RDS(on) current-sensing and calibration, which is an emerging technology. SPS is an industrial trend since it brings simplified circuitry, better current sense accuracy (typical 4-5%), stronger current sensed signal (~18 times larger than direct current resistance DCR), higher efficiency and higher power density for future high performance VR design.

There are two categories of current sense approaches being used in smart IPstages, i.e., mirror FET sense and RDS(on) sense. However, layout implementation is difficult for currently available smart IPstages. Some of control components have to be placed close to noisy switching node. Moreover, it is still hard to achieve current-sense accuracy targets now being defined by CPU manufacturers. Up to a 50% extra premium fee is required for tighter accuracy IPstages in which monolithic die and mirror FET current sense technique are used. It is also hard to enable the use of multiple types of smart power stages for a given multi-phase VR system due to complex current sense calibration circuitry implementation and interface requirements. As a result, a sole source supply for both VR controller and IPstage are often used for a multi-phase VR system design, which results in higher costs. Additionally, it is almost impossible to use one set of optimal parameters in a digital VR controller of a VR system to accommodate different supplier's IPstages when considering parameter mismatch, different layouts and noisy environment.

SUMMARY OF THE INVENTION

Disclosed herein are methods and systems that may be employed to enable calibration during the development phase of a multi-phase voltage regulator (VR) system so as to meet defined accuracy targets and, in one embodiment, to avoid the need for system level calibration in a production environment. The disclosed systems and methods may be further implemented to enable use of multiple sources for and types of IPstages (e.g., different types or models of IPstages available from a common vendor or supplier source, different types or models of IPstage available from different vendor or supplier sources, etc.) having different electrical characteristics and current sense accuracy in a common multi-phase VR system configuration while still achieving the required current sense accuracy, thus reducing or substantially eliminating continuity of supply (COS) concerns. In a further embodiment, the disclosed methods and systems may be implemented to improve accuracy of current sense in a manner that improves VR system performance, power saving and reliability. Advantageously, the disclosed methods and systems may be implemented to allow VR system optimization for different types of IPstages employed with different types of VR controllers, as opposed to optimizing a single type of IPstage for use with signal type of VR controller, e.g., such as a matching IPstage and VR controller from the same vendor or supplier.

In one exemplary embodiment, a digital VR controller may be configured to automatically recognize or select an optimized or optimal IPstage configuration file that matches a particular type of smart IPstage, e.g., a given type of IPstage available from a particular vendor or supplier. In one exemplary embodiment, an optimal or optimized set of calibrated IPstage operating parameters for a given type of IPstage may be contained in a single IPstage configuration file. Such an optimized or optimal IPstage configuration file may be selected by a digital VR controller from a set of multiple different configure files that each has an optimal set of IPstage operating parameters calibrated for a different type of IPstage, in order to match a given type of detected IPstage. In another exemplary embodiment, a definition may be provided in a digital VR controller to enable the digital VR controller to perform a second stage fine calibration based on the smart IPstage. The disclosed methods and systems may also be implemented in one exemplary embodiment to provide a system configuration that redefines tuning resolution in the digital VR controller of a multi-phase VR system, e.g., and in one embodiment enabling a multi-phase VR system configuration having embedded current sense with a larger sense signal, higher power density and efficiency than conventional VR systems.

The disclosed methods and systems may be implemented in one embodiment to perform calibration in the VR system development stage and without the presence of loading/calibration test pads, thus reducing cost and production time compared to performance of calibration during the production phase. Moreover, less printed circuit board (PCB) real estate is required for the disclosed development calibration since it saves space that would otherwise be required for loading/calibration test pads needed for production calibration, which may in turn jeopardize implementation of PCB layout optimization especially critical for space tight system applications such as blade severs.

Advantages that may be realized by implementing the disclosed methods and systems to improve VR current-sense calibration include, but are not limited to, enabling different types of smart IPstages (e.g., obtained from multiple vendors or suppliers) to be employed in a common multi-phase VR system design architecture, while still achieving the required current sense accuracy. Additionally, a power inductor with Sub-me DCR may be used, which reduces VR copper power loss especially at heavy load. In one embodiment, no VR calibration may be needed during the system manufacturing process, which in turn saves the cost and reduces logistic redundancy. PCB resources and high power density design may be accomplished with avoidance of test pads for production calibration and less external components from DCR sense. In one embodiment a two-stage VR calibration method and system may be implemented to relax the required current-sense accuracy in the IPstage/s and thus the overall cost may be reduced. Further, the disclosed systems and methods may be implemented in a manner that better utilizes resources and the advantages of both digital controller and smart power stages to avoid the need for production calibration so that overall system cost may be reduced.

In one respect, disclosed herein is a voltage regulator (VR) system, including: at least one integrated power stage (IPstage) including a power output, current sense circuitry configured to sense output current from the IPstage, and an IPstage identification (ID) recognition module having a power device identification signal output that is indicative of the identity of the IPstage; at least one processing device configured as a VR system controller coupled to control operation of the IPstage, the processing device also being coupled to receive a current sense output signal from the IPstage current sense circuitry and to receive the power device identification signal output from the IPstage; and non-volatile memory (NVM) coupled to the VR system controller, the memory storing different IPstage current sense operating parameter values corresponding to multiple different types of IPstages that include the at least one IPstage. The processing device may be configured to: receive the power device identification signal output from the IPstage, determine the identity of the at least one IPstage based on the received power device identification signal, retrieve IPstage current sense operating parameter values that correspond to the identified IPstage from the NVM, and use the retrieved IPstage current sense operating parameter values together with the current sense output signal from the IPstage current sense circuitry to determine the IPstage output current while controlling the IPstage to provide power to the VR system power output.

In another respect, disclosed herein is a method of operating a voltage regulator (VR) system that includes at least one processing device, including: using the at least one processing device to control operation of at least one integrated power stage (IPstage) of the VR system that includes a power output, current sense circuitry, and an IPstage identification (ID) recognition module having a power device identification signal output that is indicative of the identity of the IPstage; receiving a current sense output signal in the at least one processing device from the IPstage current sense circuitry and receiving the power device identification signal output in the at least one processing device from the IPstage; determining the identity of the at least one IPstage based on the received power device identification signal; retrieving IPstage current sense operating parameter values that correspond to the identified IPstage from non-volatile memory (NVM) coupled to the VR system controller, the memory storing different IPstage current sense operating parameter values corresponding to multiple different types of IPstages that include the at least one IPstage; and using the retrieved IPstage current sense operating parameter values together with the current sense output signal from the IPstage current sense circuitry to determine the IPstage output current while controlling the IPstage to provide power to the VR system power output.

In another respect, disclosed herein is a method of calibrating current sense operating parameter values for a voltage regulator (VR) system, including: A) providing a VR system that includes: at least one integrated power stage (IPstage) including a power output and current sense circuitry configured to sense output current from the IPstage, at least one processing device configured as a VR system controller coupled to control operation of the IPstage, and non-volatile memory (NVM) coupled to the VR system controller, the memory storing one or more IPstage current sense operating parameter values corresponding to the at least one IPstage; B) applying a first electrical load to the power output of the VR system and supplying power from the IPstage to the first electrical load; C) using the current sense circuitry to sense current flowing from the IPstage to the first electrical load and using the VR system controller to determine a first value of current flowing from the IPstage to the first electrical load based at least in part on the sensed current flow and the IPstage current sense operating parameter values stored in the NVM that correspond to the at least one IPstage; D) applying a second electrical load to the power output of the VR system and supplying power from the IPstage to the first electrical load, the second electrical load having a different power-consumption magnitude than the first load; E) using the current sense circuitry to sense current flowing from the IPstage to the second electrical load and using the VR system controller to determine a second value of current flowing from the IPstage to the second electrical load based at least in part on the sensed current flow and the IPstage current sense operating parameter values stored in the NVM that correspond to the at least one IPstage, the second value of current being different than the first value of current; F) using the determined first and second values of current flow to determine one or more updated IPstage operating parameter values for the IPstage that are different than the previous IPstage operating parameter values used in step E); and G) storing the updated IPstage operating parameter values for the IPstage in the VR system NVM.

DESCRIPTION OF ILLUSTRATIVE EMBODIMENTS

Figure 1:
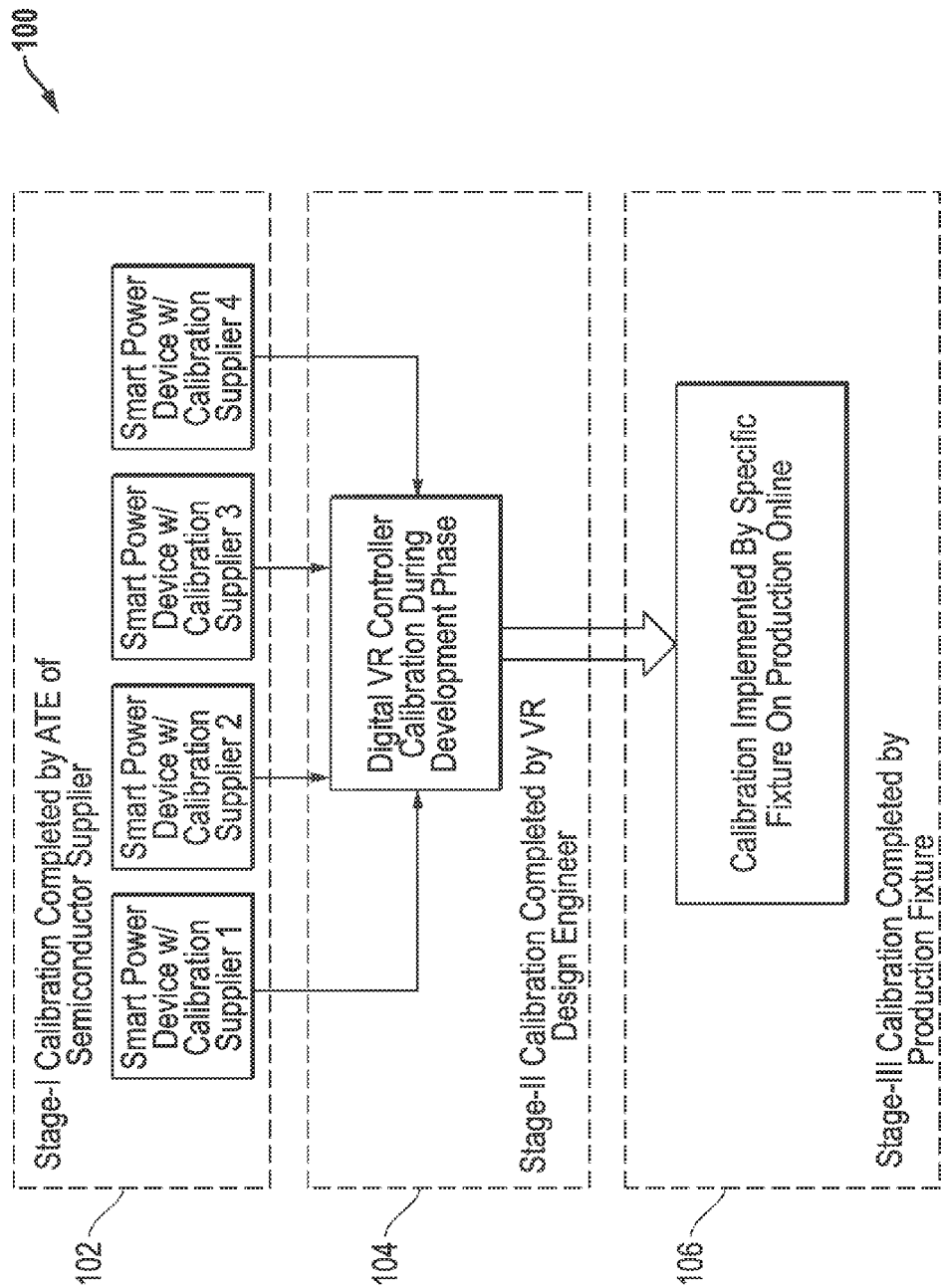
FIG. 1 illustrates three stages of current sense calibration for a multi-phase VR system according to one exemplary embodiment of the disclosed methods and systems.

FIG. 1 illustrates relationship 100 between three stages of possible opportunities for implementing current sense calibration for a multi-phase VR system that range from IPstage fabrication stage calibration 102 to VR system design or development stage calibration 104 to VR system production stage calibration 106. The accuracy of current sense in a smart IPstage may be calibrated during stage (I) 102 by different manufacturer or supplier/vendor's automatic test equipment (ATE) process (e.g., to +/−4~5% accuracy) in the heavy load range and even worse or less accuracy in light load range due to a weaker signal. This accuracy is below the +/−3% current sense accuracy currently required by CPU manufacturers. It will be understood that the degree of current sense accuracy may vary with system configuration, e.g., mirror FET current-sense technology may be implemented to achieve greater current sense accuracy than RDS (on) current sense. In any case, the accuracy of current sense may be further improved to meet a specified accuracy target if a digital VR controller is utilized to realize current sense calibration during the VR system development phase of stage (II) calibration 104 as will be described further herein. Calibration may also be optionally performed during the VR system production phase of stage (III) calibration 106 which occurs on the manufacturing or assembly line. However, in one embodiment calibration 106 during the VR system production phase may be avoided so as to reduce costs.

Figure 2:
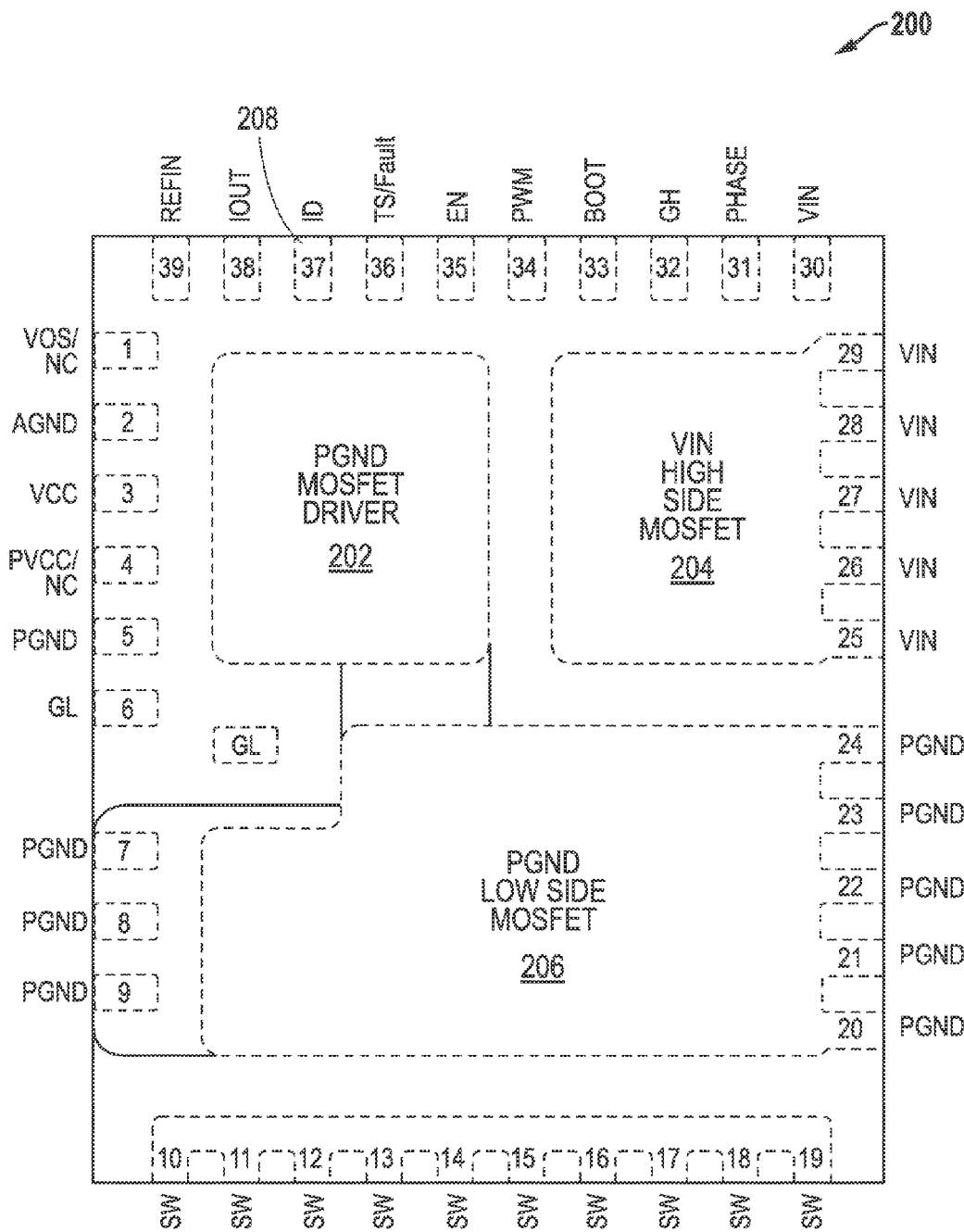
FIG. 2 illustrates a VR smart power stage footprint according to one exemplary embodiment of the disclosed methods and systems.

FIG. 2 illustrates the footprint of a VR smart power stage (IPstage) 200 that may be implemented in one exemplary embodiment of the disclosed methods and systems using MOSFET RDS(on) current sensing calibration with IPstage type identification (e.g., vendor or supplier's ID) recognition. As shown in FIG. 2, IPstage 200 is an integrated circuit chip that includes a MOSFET driver circuit 202, high-side MOSFET circuit 204, and low-side MOSFET circuit 206. As shown, IPstage 200 includes a power device identification pin 208, and in this embodiment MOSFET RDS(on) current-sense, calibration and vendor ID recognition may be integrated in this one IPstage power stage device 200. A smart IPstage may also include integrated processing device logic (e.g., such as a driver logic module 312 of FIG. 3) that is capable of executing one or more tasks of IPstage 200.

Figure 3:
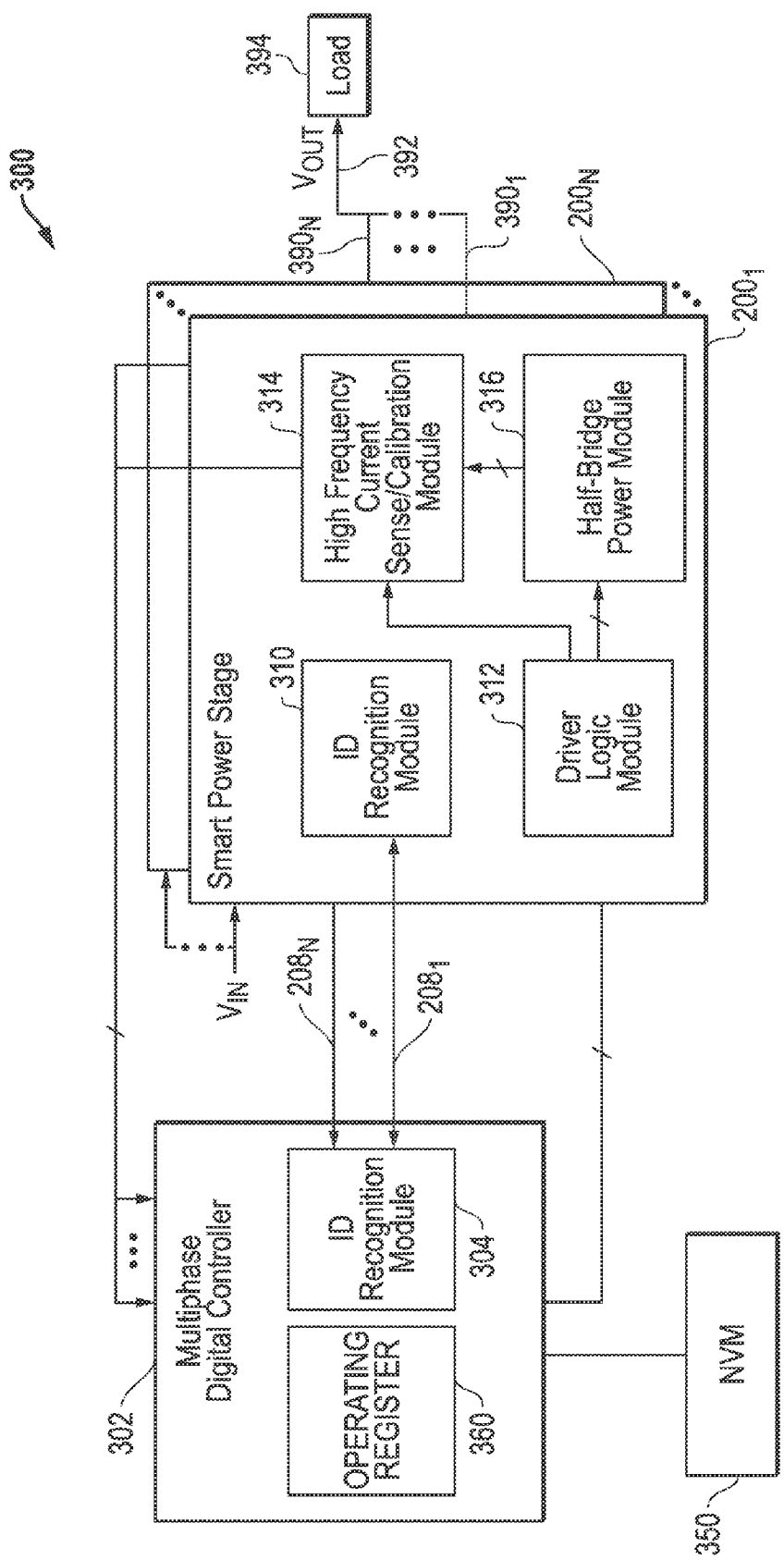
FIG. 3 illustrates a block diagram of a multi-phase VR system according to one exemplary embodiment of the disclosed methods and systems.

In the practice of the disclosed methods and systems, a digital VR controller may be configured to execute a second stage calibration, e.g., by tuning temperature coupling coefficient, current sense gain and offset. For example, FIG. 3 illustrates one exemplary embodiment of a multi-phase VR system 300 as it may be implemented with multiple IPstages $200_1$ to $200_N$ coupled to at least one processing device configured as a digital VR controller 302 that may be employed to perform VR calibration for different types of IPstages (e.g., that each have different MOSFET RDS(on) characteristics, gate charge and/or switching frequency) during the development phase of a multi-phase VR system. Such different types of IPstages 200 may be available from different vendors or suppliers. Further information on VR systems and digital VR controllers may be found in U.S. Pat. No. 7,999,520 and in U.S. patent application Ser. No. 13/768,357, filed Feb. 15, 2013, each of which is incorporated herein by reference in its entirety.

As shown in FIG. 3, each IPstage 200 has a high frequency current sense/calibration module 314 and a half-bridge power module 316 that are controlled by driver logic module 312. In this embodiment, half-bridge power module 316 of each given IPstage 200 may be configured to implement high-side MOSFET circuit 204 and low-side MOSFET circuit 206 for that given IPstage 200, while high frequency calibration module 314 of each given IPstage 200 may be configured with current sensing circuitry (e.g., such as MOSFET RDS(on) current-sense circuitry, or Inductor DC Resistance sense circuitry), as well as calibration circuitry such as tuning temperature coupling coefficient, current sense gain and offset circuitry, e.g., such as described in U.S. patent application Ser. No. 14/449,949, filed Aug. 1, 2014 which is incorporated herein by reference in its entirety. Each of IPstages 200 has an individual power output 390 that is coupled to provide output current to the VR system power output 392 as shown. System power output 392 may be coupled in one embodiment to electrical load 394 such as a system load (e.g., processing devices, cooling fans, memory devices, storage devices, etc.) of an information handling system, such as server, desktop computer, notebook computer, etc.

Still referring to FIG. 3, digital VR controller 302 includes a power device identification module 304 that is configured to recognize the identity (e.g., source vendor or supplier of particular IPstage, IPstage model number, IPstage lot number, IPstage date code or other code and/or other identifier information for the particular type of installed IPstage, etc.) of each specific type of IPstage $200_1$ to $200_N$ via a respective power device identification pin signal $208_1$ to $208_N$ that is indicative of the given IPstage identity and that is provided from an ID recognition module 310 (e.g., such as through setting different voltage levels) that may be implemented as logic by a processing device integrated into each of IPstages 200 as shown. Alternatively or additionally, ID recognition module 311 may include analog circuitry configured to produce a specified voltage or current level as a power device identification pin signal 208 to VR controller 302 based on a pre-assigned IPstage ID. It will be understood in one embodiment that all IPstages $200_1$ to $200_N$ may be the same type of IPstage that is represented by a single power device identification pin signal 208 received by VR controller 302 from only one of IPstages 200. Alternatively, one or more of IPstages $200_1$ to $200_N$ may be a different type of IPstage from one or more other IPstages $200_1$ to $200_N$ and may be coupled to provide its own respective power device identification pin signal 208 corresponding to its particular identity to VR controller 302. Digital VR controller 302 also includes internal calibrated parameter register/s 360, and is coupled to non-volatile memory (NVM) 350 that will be described further herein.

In the disclosed methods and systems, IPstage operating parameters that impact current sense accuracy may be calibrated again with intelligence of a digital controller 302 at the VR level, which is referred to herein as second stage calibration. In one embodiment of the disclosed methods and systems, tuning range for IPstage operating parameters in the digital VR controller 302 may be redefined in a fine resolution range during VR system development stage (II) calibration 104 calibration of FIG. 1. Taking current sense gain for an example, gain range may be calibrated in IPstage fabrication stage (I) calibration 102 calibration to 4.75-5.25 mV/A by IPstage given a spec 5 mV/A. In such an embodiment, digital VR controller needs to take care of only a small additional calibration range in VR system development stage (II) calibration 104 calibration, i.e., −0.25 mV/A>+0.25 mV/A. Advantageously, this disclosed second stage calibration methodology differs from conventional parameter tuning approach for applications where inductor DCR is used to sense current, because DCR range can be from 0.2 m-ohm (Vcore application) to 1 m-ohm (MEM VR or low power rail), meaning digital VR controller 302 needs to handle a relatively larger signal range and thus resolution has to be sacrificed for a given A/D and D/A capability when using the conventional DCR technique.

In the practice of the disclosed methods and systems, a VR system may be calibrated during the development (II) calibration 104 stage for one or more other IPstage operating parameters that impact current sense accuracy at the VR system 300 level. Examples of such other parameters include, but are not limited to, current sense gain, offset and temperature compensation. As an example, temperature compensation calibration conventionally performed for an IPstage 200 during IPstage fabrication stage (I) calibration 102 is based on assumption of a certain temperature coupling coefficient for an ideal application case. However, temperature compensation will actually be shifted when a given IPstage 200 is applied on a specific motherboard and under particular cooling conditions of an individual multi-phase VR system application. Similarly, any voltage offset calibration performed during IPstage fabrication stage (I) calibration 102 will typically not be able to fully and/or accurately calibrate a given IPstage 200 since actual voltage offset values during VR system operation depend highly on the level of signal noise during operation in the actual VR system application environment.

Figure 4:
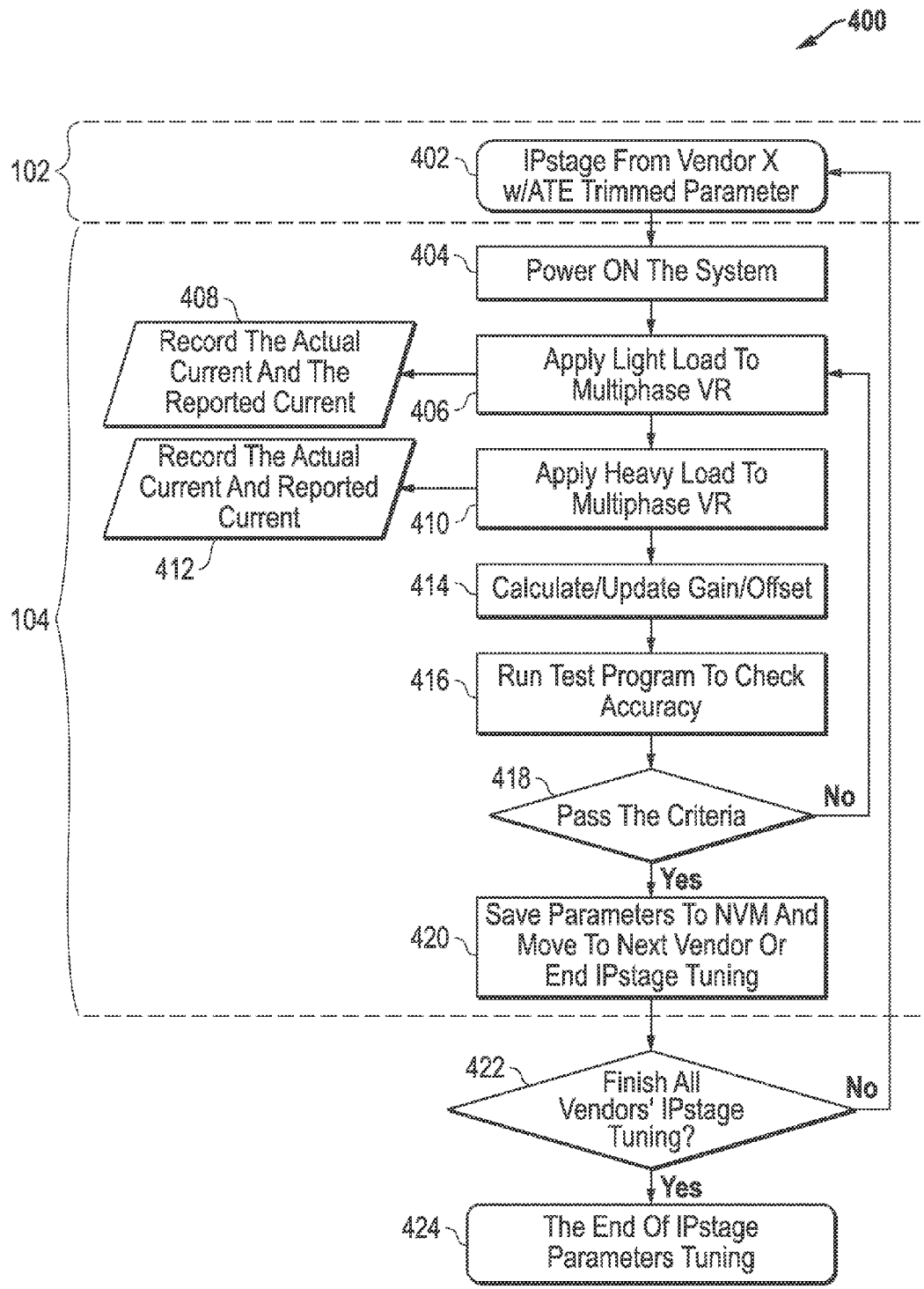
FIG. 4 illustrates a flowchart of a method for two-stage VR system operating parameter calibration according to one exemplary embodiment of the disclosed methods and systems.

FIG. 4 illustrates one exemplary embodiment of methodology 400 that may be employed to perform a two-stage IPstage operating parameter calibration for a multi-phase VR system 300 of FIG. 3 using a first IPstage fabrication stage (I) calibration 102 and a second development stage (II) calibration 104 to eventually achieve a desired (e.g., required) accuracy for each given type of IPstage 200 that is selected for calibration. As seen in FIG. 4, methodology 400 begins with first IPstage fabrication stage (I) calibration 102 that includes ATE trimming of one or more IPstage operating parameters performed as needed by a vendor or supplier (e.g., "Vendor X") of one or more IPstages 200 of a first given type of IPstage 200 in step 402.

Methodology 400 continues with second development stage (II) calibration 104 that may be performed for the first given type of IPstage 200 from at least in part using digital VR controller 302, e.g., during laboratory development and configuration of a VR system 300. In this embodiment, second development stage (II) calibration 104 includes the indicated multi-phase VR system calibration steps for the first given type of IPstage 200 that are iteratively performed as described below until calibrated IPstage operating parameters are determined that result in a pre-determined accuracy criteria for the first given type of IPstage 200 and the determined calibrated IPstage operating parameters are saved, e.g., in non-volatile memory (NVM) 350 coupled to digital VR controller 302 of FIG. 3. As shown and described below, steps of methodology 400 may then be repeated as needed for one or more additional given types of IPstages 200 until IPstage operating parameters have been calibrated and stored (e.g., as a look-up table in NVM 350) for all selected types of IPstages 200.

As shown, methodology 400 begins with power on step 404, followed by application of a first relatively light electrical load 394 (e.g., from about 5% to about 10% of the spec load in one embodiment, although greater or less loads are alternatively possible) in step 406 to a power output 392 of multi-phase VR system 300 (or other configuration of multi-phase VR system circuitry). Application of such an electrical load 394 may be performed by, for example, connecting power output 392 to a Sorensen DC Electronic Load available from AMETEK Programmable Power, Inc. of San Diego, Calif., or to other suitable test equipment having programmable load and current readback capability. In step 408, values of both the actual current (e.g., measured by test equipment such as mentioned above) and the reported current sensed at the first relatively light electrical load by high frequency current sense/calibration module 314 of a selected first given type of IPstage 200 of VR system 300 are recorded in any suitable manner, e.g., such as manually or by storing in memory and/or NVM storage of a calibration host machine such as a computer system coupled to the tested IPstage 200 and having a processing device running test system software or firmware logic. It is possible that VR system 300 may include a mixture of different types of IPstages 200 having different current sense calibration operating parameters, in which case each different given type of IPstages 200 may be separately tested as a group so that the unique operating parameters (e.g., gain and offset) for each different type of IPstage 200 may be separately determined. On the other hand, where all IPstages 200 of a given VR system 300 are of the same type or otherwise utilize the same operating parameter values, then all of the IPstages 200 may tested together.

Next, at least one additional second and different relatively heavy electrical load (e.g., from about 90% to about 100% of spec load in one embodiment, although greater or lesser loads are alternatively possible) is applied in step 410 to the power output of multi-phase VR system 300 (or other configuration of multi-phase VR system circuitry). In step 412, values of both the actual current (e.g., measured by test equipment) and the reported current sensed at the second relatively high electrical load by high frequency current sense/calibration module 314 of the first given type of IPstage 200 are recorded in any suitable manner, e.g., such as manually or by storing in memory and/or NVM storage of a calibration host machine such as a computer system coupled to the tested IPstage 200 and having a processing device running test system software or firmware logic. It will be understood that the relative magnitude of electrical loads and/or number of different electrical loads that may be applied to a VR system 300 power output 392 during calibration 104 may vary, and that it is not necessary that the first electrical load be lighter and the second electrical load heavier, as long as at least two different values of electrical load are applied during calibration. For example a first electrical load may be heavier and a second electrical load may be lighter.

Next, in step 414, the values of gain and offset in Digital Controller Operating Register 360 are updated. The updated values may be calculated for the first given type of IPstage 200 based on the previously recorded actual and sensed current values obtained in step 408 and 412, e.g., such as by plotting the recorded pairs of actual current value versus sensed current value of each of steps 408 and 412 on an X-Y plot of actual versus sensed current to construct a linear relationship that may be used to determine gain and offset calibration values, or by using any other solution methodology that is suitable for using at least two pairs of actual current value and corresponding sensed current value that are obtained at different electrical loads (i.e., a first value pair obtained at a first electrical load and a second value pair obtained at a second and different electrical load) to determine gain and offset calibration values that are suitable for correcting values of sensed current value to actual current value at other non-tested electrical loads. In this regard, step 414 may be implemented in one embodiment by computer algorithm, e.g., executing on a processing device of a calibration host machine such as a computer system coupled to the tested IPstage 200. In any case, these updated values of gain and offset may then be tested in step 416, e.g., using a test procedure run by a test program) and then evaluated in step 418 to determine if the updated values from step 414 pass a specified given criteria. Such criteria may include, for example, certain or specified range of current reporting accuracy, etc.

If the specified criteria are not found to be met in step 418, then methodology 400 returns to step 406 and repeats for the first given type of IPstage 200 starting with the most recently updated operating parameter values (e.g., current sense gain and offset calibration values) determined in step 414. However, if the specified criteria are found to be met in step 418, then methodology 400 proceeds to step 420 where the latest operating parameter values are saved to memory, e.g., such as NVM 350 of FIG. 3. Methodology 400 may then proceed as shown to step 422 where it is determined whether all given types of IPstages 200 of the tested multi-phase VR system 300 have been tuned using second development stage (II) calibration 104 steps. If not, then methodology 400 returns to step 402 and then steps 402-420 are repeated for a second given type of IPstage 200 that is different from the first given type of IPstage 200 of the tested VR system 300 to determine the unique operating parameter values (e.g., current sense gain and offset calibration values) for the second given type of IP stage 200 which are then stored separately in NVM 350. Methodology 400 may be repeated for as many different types of IPstages 300 that are present within a given multi-phase VR system 300, after which methodology 400 terminates in step 424.

In one exemplary embodiment, each of several different IPstage MOSFET vendors or suppliers, and/or each different type of IPstage MOSFET from the same vendor or supplier, may be assigned a unique IPstage device identifier (ID). Each of the vendors or suppliers may provide a different type of IPstage silicon with trimmed reporting accuracy. In this regard, each of the vendors or suppliers, and/or each different type of IPstage MOSFET from a given vendor or supplier, will typically have a certain characteristic of the current reporting which needs further optimization to achieve the best accuracy for VR system operation. Each IPstage ID, representing a unique vendor or supplier (and/or unique type of IPstage MOSFET from a given vendor or supplier), may be mapped to a set of optimized or optimal calibrated IPstage operating parameters (e.g., such as current sense (CS) gain, offset, and temperature coupling coefficient) obtained from methodology 400 of FIG. 4. It will be understood that the above operating parameters are examples only, and that each IPstage ID may be mapped to other alternative or additional parameters. Further, in another embodiment, circuit interconnection topology may be reconfigured between VR controller 302 and a given IPstage/s 200 based on determined IPstage ID.

Figure 5:
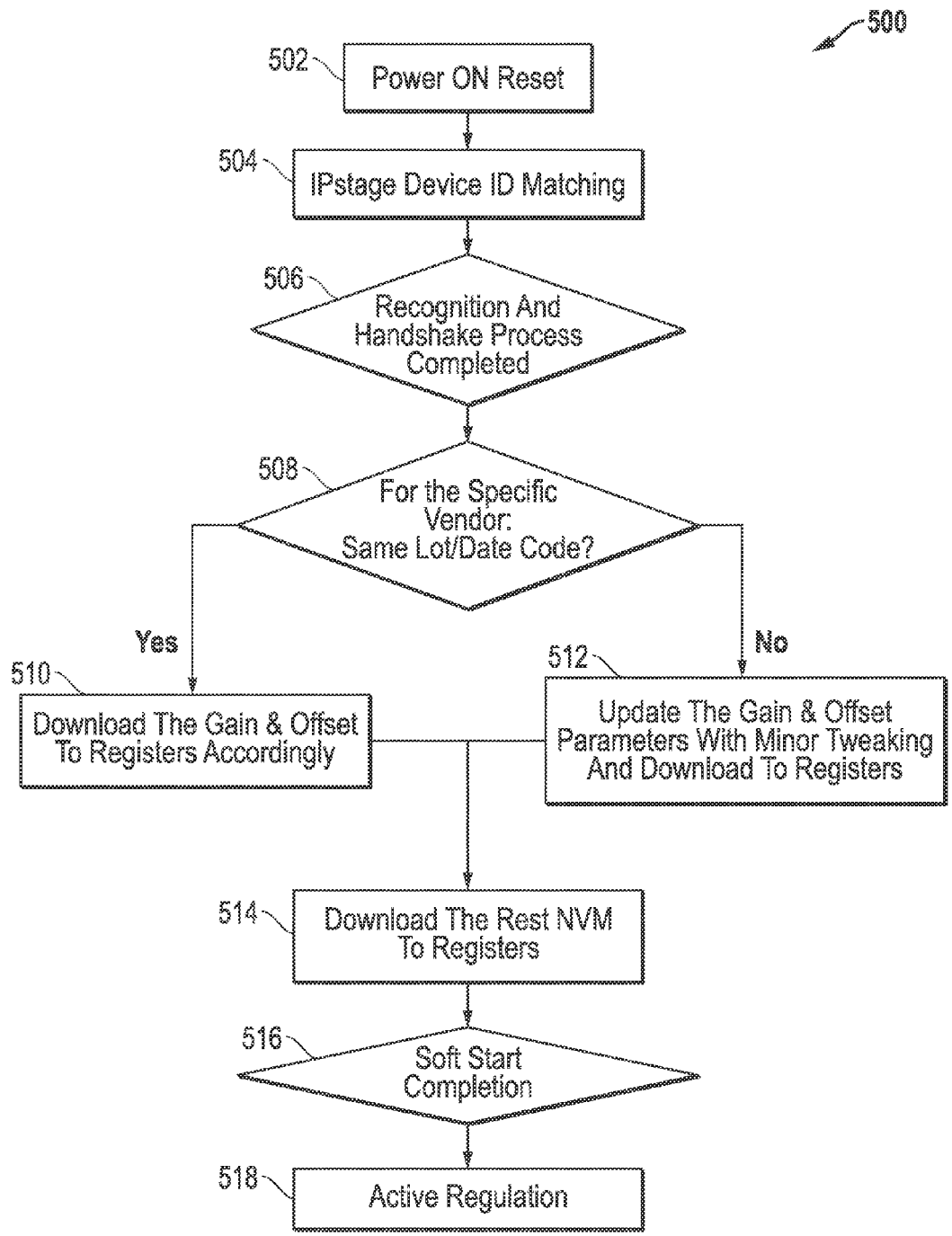
FIG. 5 illustrates a flowchart of an automated methodology for managing calibrated IPstage operating parameters for a multi-phase VR system according to one exemplary embodiment of the disclosed methods and systems.

FIG. 5 illustrates one exemplary embodiment of an automated methodology 500 that may be implemented by a digital VR controller 302 of a multi-phase VR system 300 after manufacture to manage multiple sets of optimized or optimal calibrated IPstage operating parameters each time the VR system 300 is powered up, e.g., to power a system load of an information handling system. In particular methodology 500 may be implemented to automatically select pre-optimized calibrated IPstage operating parameters (e.g., gain and offset values determined by methodology 400 of FIG. 4) from multiple sets of optimized or optimal IPstage operating parameters that have been pre-saved to NVM 350 in a single configuration file.

As shown in FIG. 5, power device identification module 304 of VR controller 302 begins in step 502 upon VR system power on or reset by identifying in step 504 one or more type/s of IPstage $200_1$ to $200_N$ that are actually present in VR system 300 via respective power device identification pin signals $208_1$ to $208_N$. As shown, recognition and handshake are completed in step 506. For each identified type of installed IPstage (e.g., from a particular vendor or supplier), VR controller 302 then proceeds to step 510 to automatically download into its internal operating register 360 the calibrated IPstage operating parameters stored in NVM 350 (e.g., from a look-up table in NVM 350) that correspond to the identified type/s of IPstage 200 determined from steps 504-506.

As shown, automated methodology 500 may also include an optional step 512 of performing additional tuning for a given type of IPstage prior to downloading IPstage operating parameters where the installed IPstage device/s is of the same type, but different lot number or date code, as the IPstage device/s used to obtain the pre-optimized calibrated IPstage operating parameters. For example, methodology 500 may proceed to step 510 if it is determined in step 508 that the installed IPstage device/s have the same lot number and date code as the IPstage device/s used to obtain the pre-optimized calibrated IPstage operating parameters. However, methodology 500 may proceed from step 508 to step 512 to tune the operating parameters by modifying the parameters if it is determined in optional step 508 that the installed IPstage device/s is of a different lot number or date code as the IPstage device/s used to obtain the pre-optimized calibrated IPstage operating parameters. Operating parameters may be optionally modified (e.g., by minor tweaking) in optional step 512, for example, by retrieving or otherwise accessing (e.g., from a different data record, an alternative storage device, a network communication path, etc.) additional and more detailed calibrated IPstage operating parameters. Such additional IPstage operating parameter may be, for example, previously obtained for particular IPstage lot numbers or date codes (e.g., using the procedure of FIG. 4), provided as manufacturer operating parameter calibration information that is specific to a particular IPstage lot number or date code, etc.

Alternatively, where optional steps 508 and 512 are not employed, methodology 500 may proceed directly from step 506 to step 510 where the stored calibrated IPstage operating parameters are directly downloaded unmodified into operating register 360 from NVM 350. In either case, all of the remaining pre-stored parameters (e.g., such as selected switching frequency, selected number of IPstage phases for VR system operation, etc.) in NVM 350 may then be downloaded to registers 360 in step 514. After downloading the calibrated IPstage operating parameters into internal operating register 360, system soft start may be completed in step 516 and VR controller 302 proceeds to active power regulation in step 518, e.g., to power a system load of an information handling system.

Figure 6:
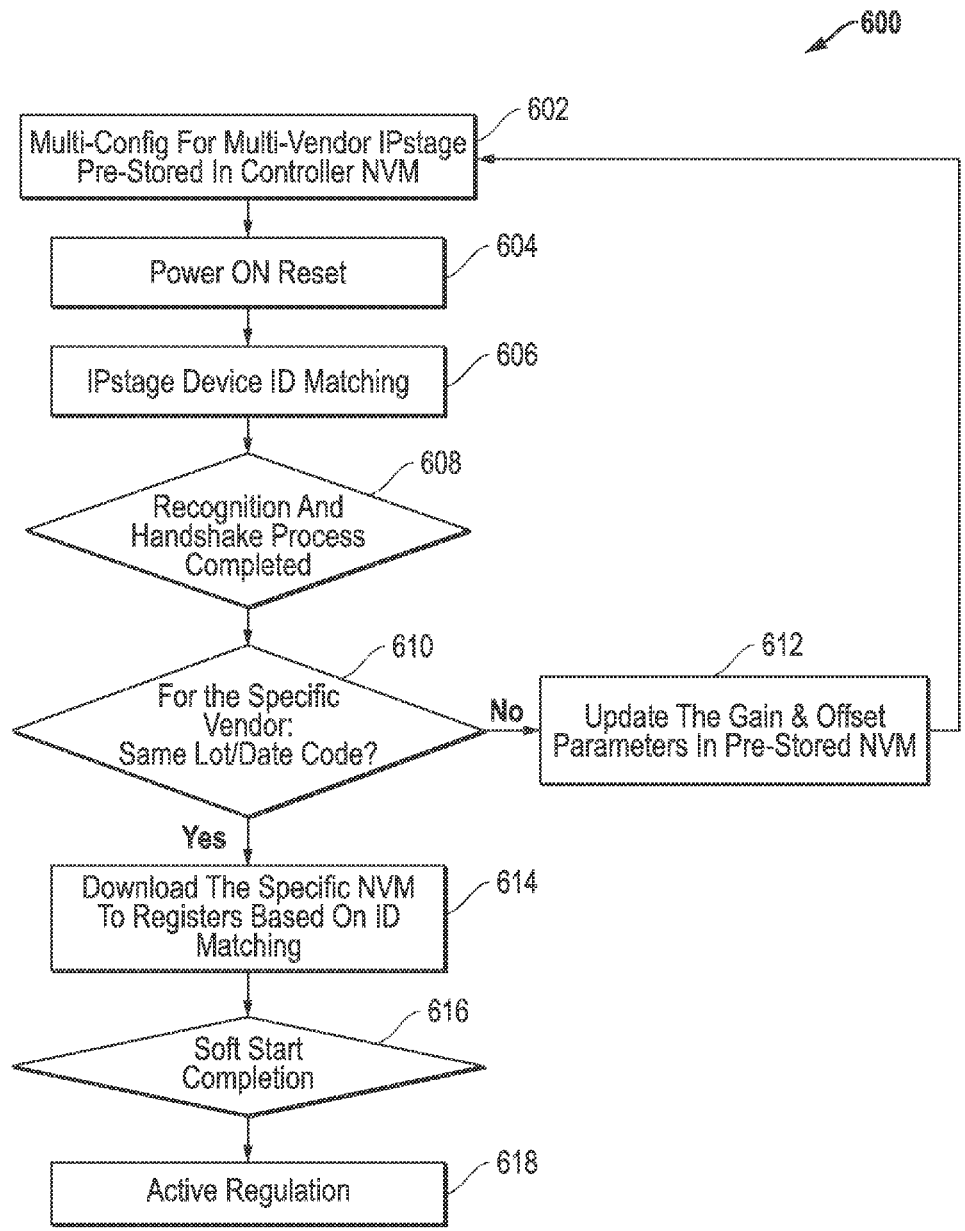
FIG. 6 illustrates a flowchart of an automated methodology for managing multiple configuration files for a multi-phase VR system according to one exemplary embodiment of the disclosed methods and systems.

FIG. 6 illustrates another exemplary embodiment of automated methodology 600 that may be implemented by a digital VR controller 302 of a multi-phase VR system 300 to manage multiple configuration files that are each assigned to a different given type of IPstage device, e.g., obtained from a different vendor or supplier. In methodology 600, each different given type of IPstage is assigned one configuration file with pre-optimized calibrated IPstage operating parameters, and in step 602 each of these configuration files may be pre-saved in NVM 350 or other suitable system memory associated with server system controller, server management subsystem iDRAC, etc.

Still referring to FIG. 6, upon VR system power on or reset in step 604, methodology 600 proceeds in steps 606 and 608 by identifying one or more type/s of IPstage $200_1$ to $200_N$ that are actually present in VR system 300 via respective power device identification pin signals $208_1$ to $208_N$. For each identified type of installed IPstage (e.g., from a particular vendor or supplier), a specific configuration file of pre-optimized calibrated IPstage operating parameters may be automatically selected in step 614 to download from NVM 350 into internal operating register 360 of digital VR controller 302 during system initialization. As shown, before downloading calibrated IPstage operating parameters to register/s 360 in step 614, automated methodology 600 may also include an optional step 612 of first updating the pre-optimized calibrated IPstage operating parameters contained in the corresponding pre-saved configuration file on NVM 350 for a given type of IPstage where the installed IPstage device/s is of the same type, but found in optional step 610 to be of a different lot number or date code, as the IPstage device/s used to obtain the pre-optimized calibrated IPstage operating parameters that are pre-saved in the configuration file. In this regard optional step 612 may be performed in similar manner as optional step 512 of methodology 500 with the exception that the updated modified IPstage operating parameters may be stored in the corresponding configuration file of NVM 350 together with updated lot/date code identifier prior to returning to step 602 and repeating as shown. After downloading the calibrated IPstage operating parameters into internal operating register 360 in step 614, system soft start may be completed in step 616 and VR controller 302 proceeds to active power regulation in step 618.

It will be understood that optimized or optimal IPstage operating parameters and/or configuration files of FIGS. 5 and/or 6 may be stored in any alternative memory or storage device (e.g., other than a NVM 350), e.g., such as pre-installed in memory associated with a server system controller, server management subsystem or an integrated Dell Remote Access Controller (iDRAC) available from Dell Products L.P. of Round Rock, Tex. Moreover, it is also possible that methodology 500 or 600 may alternatively be implemented using other suitable system processing device/s besides VR controller 302. Examples of server system controllers, memory and the like may be found in United States Patent Application Publication Number 20120275610 and U.S. patent application Ser. No. 13/477, 837, filed May 22, 2012, each of which is incorporated herein by reference in its entirety.

It will be understood that the particular number and sequence of steps of methodologies 400, 500 and 600 are exemplary only, and that any other combination and/or sequence of fewer, additional, and/or alternative steps that are suitable for performing IPstage calibration and management of calibrated IPstage operating parameters for a VR system.

It will also be understood that one or more of the tasks, functions, or methodologies described herein (e.g., including those described for VR controller 302 and/or a server system controller, server management subsystem iDRAC or the like) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A voltage regulator (VR) system, comprising:
   at least one integrated power stage (IPstage) comprising a power output, current sense circuitry configured to sense output current from the at least one IPstage, and an IPstage identification (ID) recognition module having a power device identification signal output that is indicative of the identity of the at least one IPstage;
   at least one processing device configured as a VR system controller coupled to control operation of the at least one IPstage, the at least one processing device also being coupled to receive a current sense output signal from the IPstage current sense circuitry and to receive the power device identification signal output from the at least one IPstage; and
   non-volatile memory (NVM) coupled to the VR system controller, the memory storing different IPstage operating parameter values corresponding to multiple different types of IPstages that include the at least one IPstage;
   where the at least one processing device is configured to:
      receive the power device identification signal output from the at least one IPstage,
      determine the identity of the at least one IPstage based on the received power device identification signal,
      retrieve IPstage operating parameter values that correspond to the identified IPstage from the NVM, and
      use the retrieved IPstage operating parameter values together with the current sense output signal from the IPstage current sense circuitry to determine IPstage output current while controlling the at least one IPstage to provide power to the VR system power output.

2. The system of claim 1, where the IPstage operating parameter values that correspond to the identified IPstage are stored on the NVM together with multiple sets of IPstage operating parameters for different types of IPstages in a single configuration file, each of the multiple different types of IPstages having different electrical characteristics and current sense circuitry accuracy; and where the processing device is configured to identify and retrieve the IPstage operating parameter values that correspond to an identified type of IPstage from the single configuration file.

3. The system of claim 2, where the processing device is further configured to determine if the identified type of IPstage has a manufacturing date and/or lot code that matches a manufacturing date and/or lot code assigned to the retrieved IPstage operating parameter values; and to update the retrieved IPstage operating parameter values by tuning the retrieved IPstage operating parameter values prior to determining the IPstage output current if the manufacturing date and/or lot code of the identified type of IPstage does not match the manufacturing date and/or lot code assigned to the retrieved IPstage operating parameter values.

4. The system of claim 1, where the VR system comprises multiple different IPstages that correspond to the multiple different types of IPstages, each of the multiple different types of IPstages having different electrical characteristics and current sense circuitry accuracy; and where the processing device is configured to:
   separately receive the power device identification signal output from each of the different types of IPstages of the VR system;
   determine the identity of each of the different IPstages based on the received power device identification signal;
   retrieve IPstage operating parameter values that correspond to each of the identified different IPstages from the NVM; and
   use the retrieved IPstage operating parameter values for each one of the different types of IPstages together with the current sense output signal from the IPstage current sense circuitry of each corresponding one of the different types of IPstages to determine the IPstage output current from the IPstage current sense circuitry of each corresponding one of the different types of IPstages while controlling each corresponding one of different IPstages to provide power to the VR system power output.

5. The system of claim 4, where IPstage operating parameter values are stored in multiple different configuration files on the NVM, each of the multiple different configuration files containing IPstage operating parameters for a different given type of IPstage device from a particular vendor or supplier source stored on the NVM; and where the processing device is configured to identify and select a configuration file that corresponds to the vendor or supplier source of the identified type of IPstage, and to retrieve the IPstage operating parameter values from the selected configuration file that correspond to an identified type of IPstage from the single configuration file.

6. The system of claim 4, where the processing device is further configured to determine if the identified type of IPstage has a manufacturing date and/or lot code that matches a manufacturing date and/or lot code assigned to retrieved IPstage operating parameter values; and to update IPstage operating parameter values stored in the selected configuration file on the NVM by tuning retrieved IPstage operating parameter values prior to determining the IPstage output current if the manufacturing date and/or lot code of the identified type of IPstage does not match the manufacturing date and/or lot code assigned to retrieved IPstage operating parameter values, and updating the selected configuration file on the NVM by storing the tuned IPstage operating parameters.

7. The system of claim 1, where the IPstage operating parameters comprises at least one of current sense gain, current sense offset, current sense temperature compensation, or a combination thereof.

8. A method of operating a voltage regulator (VR) system that includes at least one processing device, comprising:
using the at least one processing device to control operation of at least one integrated power stage (IPstage) of the VR system that includes a power output, current sense circuitry, and an IPstage identification (ID) recognition module having a power device identification signal output that is indicative of the identity of the at least one IPstage;
receiving a current sense output signal in the at least one processing device from the IPstage current sense circuitry and receiving the power device identification signal output in the at least one processing device from the at least one IPstage; and
determining the identity of the at least one IPstage based on the received power device identification signal,
retrieving IPstage operating parameter values that correspond to the identified IPstage from non-volatile memory (NVM) coupled to a VR system controller, the memory storing different IPstage operating parameter values corresponding to multiple different types of IPstages that include the at least one IPstage, and
using the retrieved IPstage operating parameter values together with the current sense output signal from the IPstage current sense circuitry to determine a IPstage output current while controlling the at least one IPstage to provide power to the VR system power output.

9. The method of claim 8, where the IPstage operating parameter values that correspond to the identified IPstage are stored on the NVM together with multiple sets of IPstage operating parameters for different types of IPstages in a single configuration file, each of the different types of IPstages having different electrical characteristics and current sense circuitry accuracy; and where the method further comprises using the at least one processing device to identify and retrieve IPstage operating parameter values that correspond to an identified type of IPstage from the single configuration file.

10. The method of claim 8, further comprising using the at least one processing device to:
determine if the identified type of IPstage has a manufacturing date and/or lot code that matches a manufacturing date and/or lot code assigned to the retrieved IPstage operating parameter values; and
update the retrieved IPstage operating parameter values by tuning the retrieved IPstage operating parameter values prior to determining the IPstage output current if the manufacturing date and/or lot code of the identified type of IPstage does not match the manufacturing date and/or lot code assigned to the retrieved IPstage operating parameter.

11. The method of claim 8, where the VR system comprises multiple different types of IPstages, each of the multiple different types of IPstages having different electrical characteristics and current sense circuitry accuracy; and where the method further comprises using the at least one processing device to:
separately receive the power device identification signal output from each of the different types of IPstages of the VR system;
determine the identity of each of the different types of IPstages based on a received power device identification signal;
retrieve IPstage operating parameter values that correspond to each of the identified different types of IPstages from the NVM; and
use the retrieved IPstage operating parameter values for each one of the different types of IPstages together with the current sense output signal from the IPstage current sense circuitry of each corresponding one of the different types of IPstages to determine a IPstage output current from the IPstage current sense circuitry of each corresponding one of the different types of IPstages while controlling each corresponding one of different types of IPstages to provide power to the VR system power output.

12. The method of claim 11, where IPstage operating parameter values are stored in multiple different configuration files on the NVM, each of the multiple different configuration files containing IPstage operating parameters for a different given type of IPstage device from a particular vendor or supplier source stored on the NVM; and where the method further comprises using the at least one processing device to identify and select a configuration file that corresponds to a vendor or supplier source of an identified type of IPstage, and to retrieve the IPstage operating parameter values from the selected configuration file that correspond to an identified type of IPstage from the single configuration file.

13. The method of claim 12, further comprising using the at least one processing device to:
determine if the identified type of IPstage has a manufacturing date and/or lot code that matches a manufacturing date and/or lot code assigned to the retrieved IPstage operating parameter values; and
update the IPstage operating parameter values stored in the selected configuration file on the NVM by tuning the retrieved IPstage operating parameter values prior to determining IPstage output current if the manufacturing date and/or lot code of the identified type of IPstage does not match a manufacturing date and/or lot code assigned to retrieved IPstage operating parameter values, and updating the selected configuration file on the NVM by storing the updated IPstage operating parameter values.

14. The method of claim 8, where the IPstage operating parameters comprises at least one of current sense gain, current sense offset, current sense temperature compensation or a combination thereof.

15. A method of calibrating operating parameter values for a voltage regulator (VR) system, comprising:
   A) providing a VR system that includes:
      at least one integrated power stage (IPstage) comprising a power output and current sense circuitry configured to sense output current from the at least one IPstage,
      at least one processing device configured as a VR system controller coupled to control operation of the at least one IPstage, and
      non-volatile memory (NVM) coupled to the VR system controller, the memory storing IPstage operating parameter values corresponding to the at least one IPstage;
   B) applying a first electrical load to the power output of the VR system and supplying power from the IPstage to the first electrical load;
   C) using the current sense circuitry to sense current flowing from the at least one IPstage to the first electrical load and using the VR system controller to determine a first value of current flowing from the at least one IPstage to the first electrical load based at least in part on the sensed current flow and the IPstage operating parameter values stored in the NVM that correspond to the at least one IPstage;
   D) applying a second electrical load to the power output of the VR system and supplying power from the at least one IPstage to the first electrical load, the second electrical load having a different power-consumption magnitude than the first load;
   E) using the current sense circuitry to sense current flowing from the at least one IPstage to the second electrical load and using the VR system controller to determine a second value of current flowing from the at least one IPstage to the second electrical load based at least in part on the sensed current flow and the IPstage operating parameter values stored in the NVM that correspond to the at least one IPstage, the second value of current being different than the first value of current;
   F) using the determined first and second values of current flow to determine updated IPstage operating parameter values for the IPstage that are different than the previous IPstage operating parameter values used in step E); and
   G) storing the updated IPstage operating parameter values for the at least one IPstage in the VR system NVM.

16. The method of claim 15, further comprising determining an initial value of the IPstage operating parameters for the at least one IPstage during IPstage fabrication and automatic test equipment (ATE) trimming by a vendor or supplier of the at least one IPstage; and storing the initial value of IPstage operating parameters in the NVM before performing step B).

17. The method of claim 15, further comprising performing the following steps as a part of step F), and before performing step G):
   1) causing a known test current to flow from the at least one IPstage, the test current having a known current value;
   2) using the VR system controller to determine a calculated value of current flow that corresponds to the test current flowing from the at least one IPstage based at least in part on current flow of the test current and most recent updated IPstage operating parameter values stored in the NVM that correspond to the at least one IPstage;
   3) comparing the calculated value of current flow to the known value of the test current flow to determine if the calculated value of current flow differs from the known value of the test current flow by more than a pre-determined amount; and
   4) repeating steps B) through F) until the calculated value of current flow differs from the known value of the test current flow by less than or equal to the pre-determined amount before leaving step F) to perform step G).

18. The method of claim 17, where the VR system comprises multiple different types of IPstages, each of the multiple different types of IPstages having different electrical characteristics and current sense circuitry accuracy; and where the method further comprises separately performing steps B) through G) for each different type of IPstage of the VR system; and separately storing updated IPstage operating parameter values for each of the multiple different types of IPstage in the VR system NVM.

19. The method of claim 15, where the VR system comprises multiple different types of IPstages, each of the multiple different types of IPstages having different electrical characteristics and current sense circuitry accuracy; and where the method further comprises separately performing steps B) through G) for each different type of IPstage of the VR system; and separately storing updated IPstage operating parameter values for each of the multiple different types of IPstage in the VR system NVM.

* * * * *